United States Patent
Harrison

(10) Patent No.: US 12,545,269 B2
(45) Date of Patent: Feb. 10, 2026

(54) GEOGRAPHICALLY DISPARATE SENSOR FUSION FOR ENHANCED TARGET DETECTION AND IDENTIFICATION IN AUTONOMOUS VEHICLES

(71) Applicant: BDCM A2 LLC, Dover, DE (US)

(72) Inventor: Matthew Paul Harrison, Palo Alto, CA (US)

(73) Assignee: BDCM A2 LLC, Dover, DE (US)

( * ) Notice: Subject to any disclaimer, the term of this patent is extended or adjusted under 35 U.S.C. 154(b) by 457 days.

(21) Appl. No.: 17/973,385

(22) Filed: Oct. 25, 2022

(65) Prior Publication Data

US 2023/0052240 A1   Feb. 16, 2023

Related U.S. Application Data

(63) Continuation of application No. 16/432,921, filed on Jun. 5, 2019, now Pat. No. 11,479,262.

(60) Provisional application No. 62/681,581, filed on Jun. 6, 2018.

(51) Int. Cl.
  *G01S 13/931* (2020.01)
  *B60W 30/08* (2012.01)
  *B60W 50/04* (2006.01)
  *G01S 13/86* (2006.01)

(52) U.S. Cl.
  CPC ......... *B60W 50/045* (2013.01); *B60W 30/08* (2013.01); *G01S 13/867* (2013.01); *G01S 13/931* (2013.01); *B60W 2420/408* (2024.01)

(58) Field of Classification Search
  CPC ........... B60W 2420/408; B60W 30/08; B60W 50/045; G01S 13/865; G01S 13/867; G01S 13/87; G01S 13/931; G01S 2013/9316; G01S 7/003
  See application file for complete search history.

(56) References Cited

U.S. PATENT DOCUMENTS

| | | | |
|---|---|---|---|
| 2016/0054452 A1* | 2/2016 | Cosatto | G01S 11/12 701/412 |
| 2018/0261095 A1* | 9/2018 | Qiu | G01S 17/86 |
| 2021/0083395 A1* | 3/2021 | Achour | H01Q 3/36 |
| 2021/0255300 A1* | 8/2021 | Harrison | G01S 13/931 |

* cited by examiner

*Primary Examiner* — Timothy A Brainard
(74) *Attorney, Agent, or Firm* — Dinsmore & Shohl LLP

(57) ABSTRACT

Examples disclosed herein relate to an autonomous driving system in an ego vehicle. The autonomous driving system includes a radar system configured to detect and identify a target in a path and a surrounding environment of the ego vehicle. The autonomous driving system also includes a sensor fusion module configured to receive radar data on the identified target from the radar system and compare the identified target with one or more targets identified by a plurality of perception sensors that are geographically disparate from the radar system. Other examples disclosed herein include a method of operating the radar system in the autonomous driving system of the ego vehicle.

19 Claims, 8 Drawing Sheets

GEOGRAPHICALLY DISPARATE SENSOR FUSION FOR ENHANCED TARGET DETECTION AND IDENTIFICATION IN AUTONOMOUS VEHICLES

CROSS-REFERENCE TO RELATED APPLICATIONS

This application claims priority from U.S. Non-Provisional application Ser. No. 16/432,921, titled "GEOGRAPHICALLY DISPARATE SENSOR FUSION FOR ENHANCED TARGET DETECTION AND IDENTIFICATION IN AUTONOMOUS VEHICLES," filed on Jun. 5, 2019, and incorporated herein by reference in its entirety; and which claims priority from U.S. Provisional Application No. 62/681,581, titled "GEOGRAPHICALLY DISPARATE SENSOR FUSION FOR ENHANCED TARGET DETECTION AND IDENTIFICATION IN AUTONOMOUS VEHICLES," filed on Jun. 6, 2018, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and in which.

DETAILED DESCRIPTION

Geographically disparate sensor fusion for enhanced target detection and identification in autonomous vehicles is disclosed. The geographically disparate sensor fusion receives perception data collected by geographically disparate autonomous vehicles and combines the data to enhance target detection and identification for an ego vehicle in the vehicle's path and surrounding environment. The targets may include structural elements in the environment such as roads, walls, buildings, road center medians and other objects, as well as vehicles, pedestrians, bystanders, cyclists, plants, trees, animals and so on.

In various examples, the ego vehicle is equipped with multiple perception sensors capable of capturing real-world perception data about its path and surrounding environment, including radar, lidar, camera, and so forth. Each one of the perception sensors may have different range and resolution capabilities. The ego vehicle is also equipped with a vehicle to vehicle ("V2V") communications module for communicating with other vehicles, including other autonomous vehicles equipped with perception sensors. A sensor fusion module in the ego vehicle combines data from different perception sensors in the ego vehicle and data received from perception sensors in other geographically disparate autonomous vehicles to perceive its environment more accurately and enhance target detection and identification. The enhanced target detection and identification improves the training and perceptual inference performance of the ego vehicle. As used herein, the term "autonomous vehicle" may be referred to as an autonomous transport machine for transporting one or more passengers independent of any, if not at least partial, control by any one of the passengers. As used herein, the term "ego vehicle" may refer to a type of autonomous vehicle and may also be referred to as a type of autonomous transport machine.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
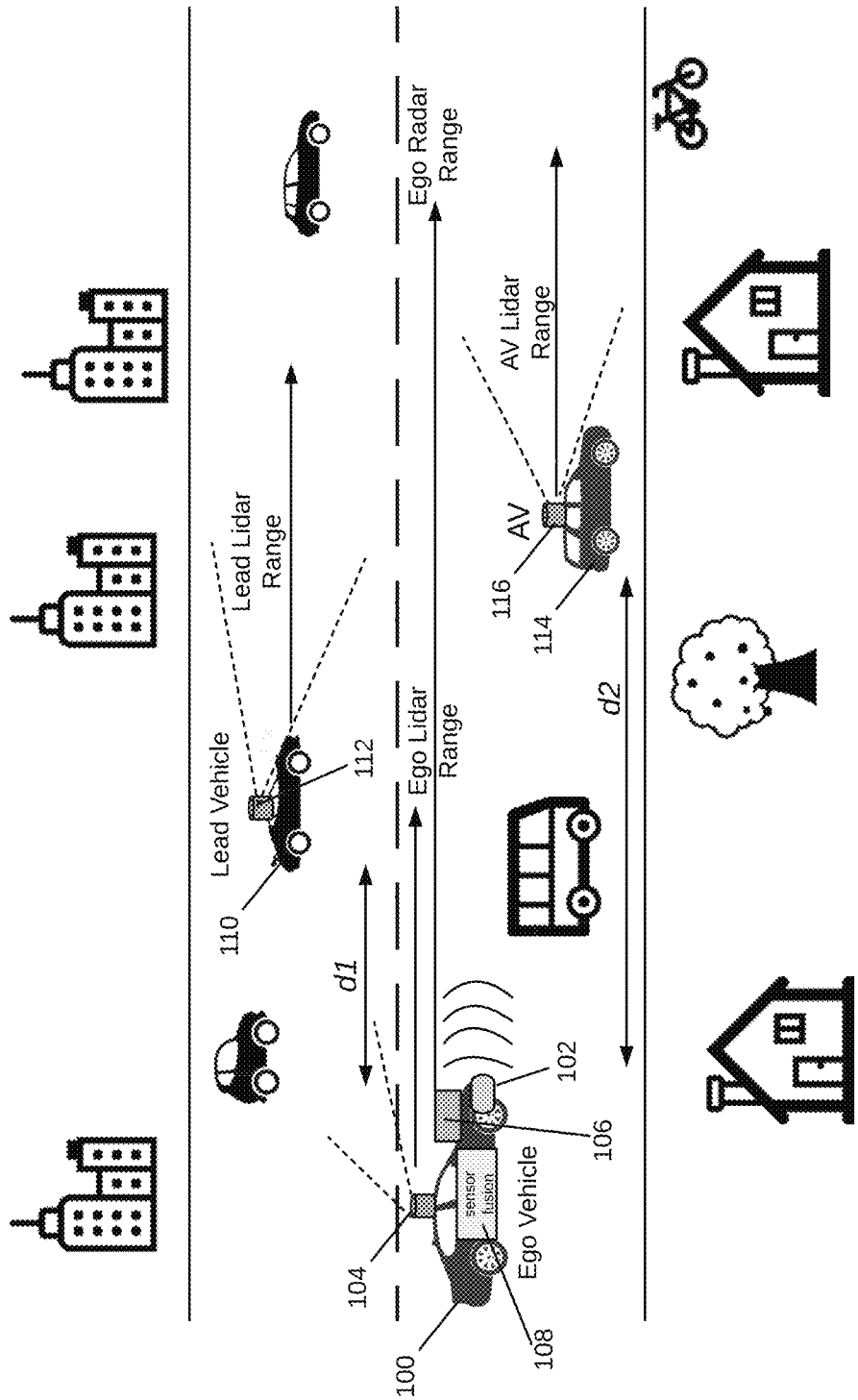
FIG. 1 is a schematic diagram of an example environment in which geographically disparate sensor fusion in an ego vehicle enhances target detection and identification in the environment.

FIG. 1 illustrates an example environment in which geographically disparate sensor fusion in an ego vehicle enhances target detection and identification in the environment. Ego vehicle 100 is an autonomous vehicle having multiple perception sensors, including camera 102, lidar 104, and radar 106, among others. Camera sensor 102 may be used to detect visible targets and conditions and to assist in the performance of various functions. The lidar sensor 104 can also be used to detect targets outside the ego vehicle 100 and provide this information to adjust control of the vehicle. This information may include information such as congestion on a highway, road conditions, and other conditions that would impact the sensors, actions or operations of the vehicle. Camera sensors are currently used in Advanced Driver Assistance Systems ("ADAS") to assist drivers in driving functions such as parking (e.g., in rear view cameras). Cameras are able to capture texture, color and contrast information at a high level of detail, but similar to the human eye, they are susceptible to adverse weather conditions and variations in lighting. Camera 102 may have a high resolution but may not capture images of targets beyond 50 meters. Lidar sensors measure the distance to an object by calculating the time taken by a pulse of light to travel to an object and back to the sensor. When positioned on top of a vehicle, lidar sensors can provide a 360° three-dimensional ("3D") view of the surrounding environment. However, lidar sensors, such as lidar 104, are still prohibitively expensive, bulky in size, sensitive to weather conditions and are limited to short ranges (e.g., less than 150-200 meters), with resolution decreasing with range. Radar sensors, on the other hand, have been used in vehicles for many years and operate in all-weather conditions. Radar sensors also use far less processing than the other types of sensors and have the advantage of detecting targets behind obstacles and determining the speed of moving targets.

In various examples and as described in more detail below, radar 106 is an Intelligent Metamaterial ("iMTM") radar system capable of providing a 360° true 3D vision and human-like interpretation of the ego vehicle's path and surrounding environment. The iMTM radar system is capable of shaping and steering radio frequency ("RF") beams in all directions in a 360° field-of-view ("FoV") and recognizing targets quickly with a high degree of accuracy over a long range of around 300 meters or more. The short-range capabilities of camera 102 and lidar 104 and the long-range capabilities of radar 106 enable a sensor fusion module 108 in ego vehicle 100 to enhance its target detection and identification capabilities.

Target detection and identification is also enhanced with sensor fusion module 108 using data received from other autonomous vehicles. For example, a lead vehicle 110 with a lidar 112 may be placed along the path of ego vehicle 100 and at a distance d1 away from it. Lead vehicle lidar 112 has a short range as indicated in FIG. 1 that may complement the short range of the ego vehicle lidar 104. Autonomous Vehicle ("AV") 114 is also shown at a distance d2 away from the ego vehicle 100. AV 114 includes AV lidar 116, which has a similar short range to lead vehicle lidar 112 and ego vehicle lidar 104. It is noted that d1 and d2 can be adjusted as desired throughout data gathering by ego vehicle 100, lead vehicle 110 and AV vehicle 114. It is also noted that ego vehicle 100 may rely on multiple lead and autonomous vehicles in geographically disparate positions to assist its understanding of its surrounding environment.

In various examples, lidars 104, 112 and 116 can all be used to complement the information acquired by radar 106 and camera 102 and improve the performance of an autonomous driving system in ego vehicle 100. The autonomous driving system may rely on the use of an iMTM radar (e.g., radar 106) with machine and deep learning capabilities. The system benefits from the sensor fusion of geographically disparate sensors for training its machine and deep learning networks and improving their training and perceptual inference performance.

Figure 2:
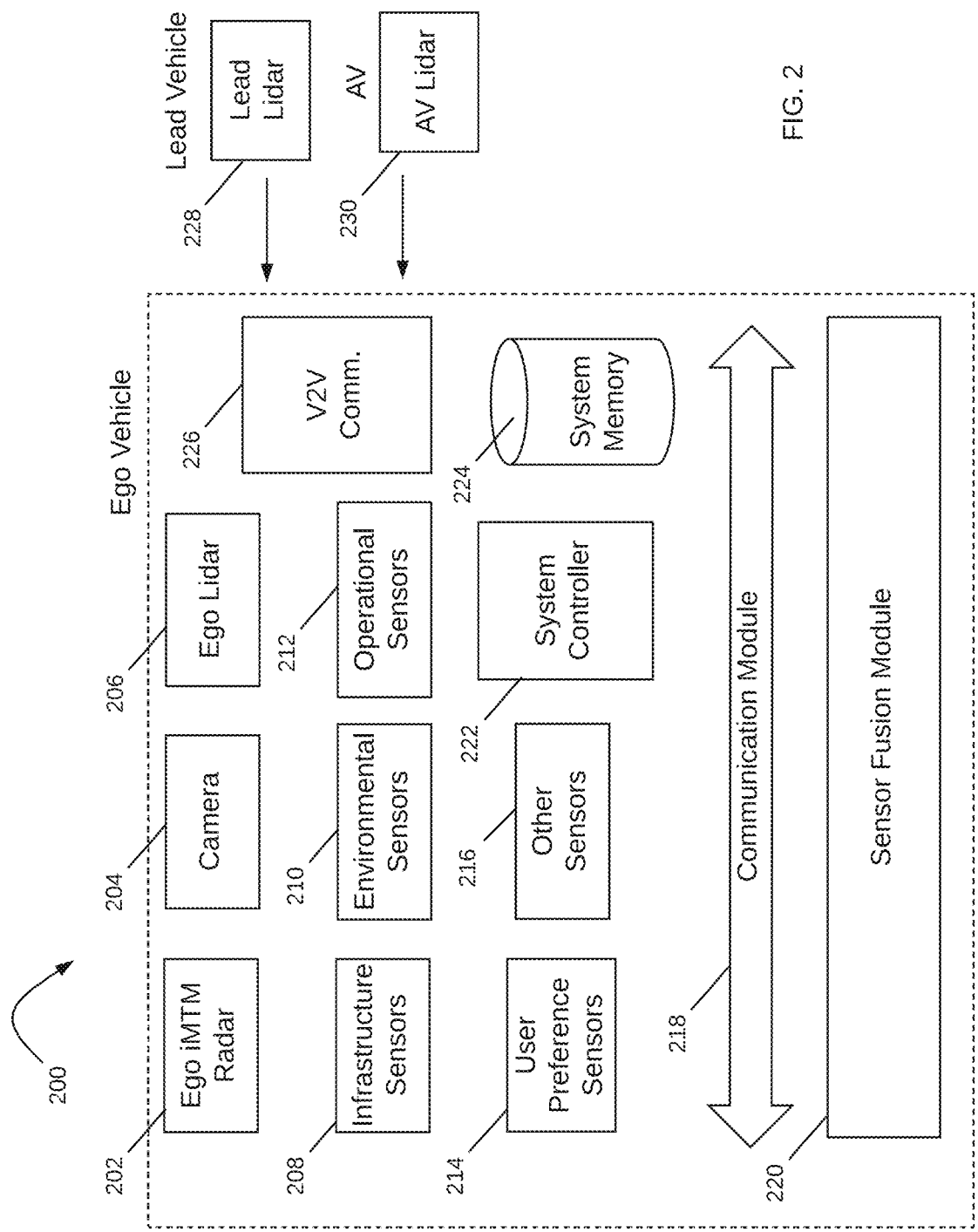
FIG. 2 is a schematic diagram of an autonomous driving system for an ego vehicle in accordance with various examples.

A schematic diagram of an autonomous driving system 200 for an ego vehicle in accordance with various examples is illustrated in FIG. 2. Autonomous driving system 200 is a system for use in an ego vehicle that provides partial or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes an ego iMTM radar 202 and other sensor systems such as camera 204, lidar 206, infrastructure sensors 208, environmental sensors 210, operational sensors 212, user preference sensors 214, and other sensors 216. Autonomous driving system 200 also includes a communications module 218, a sensor fusion module 220, a system controller 222, a system memory 224, and a V2V communications module 226. It is appreciated that this configuration of autonomous driving system 200 is an example configuration and not meant to be limiting to the specific structure illustrated in FIG. 2. Additional systems and modules not shown in FIG. 2 may be included in autonomous driving system 200.

Figure 4:
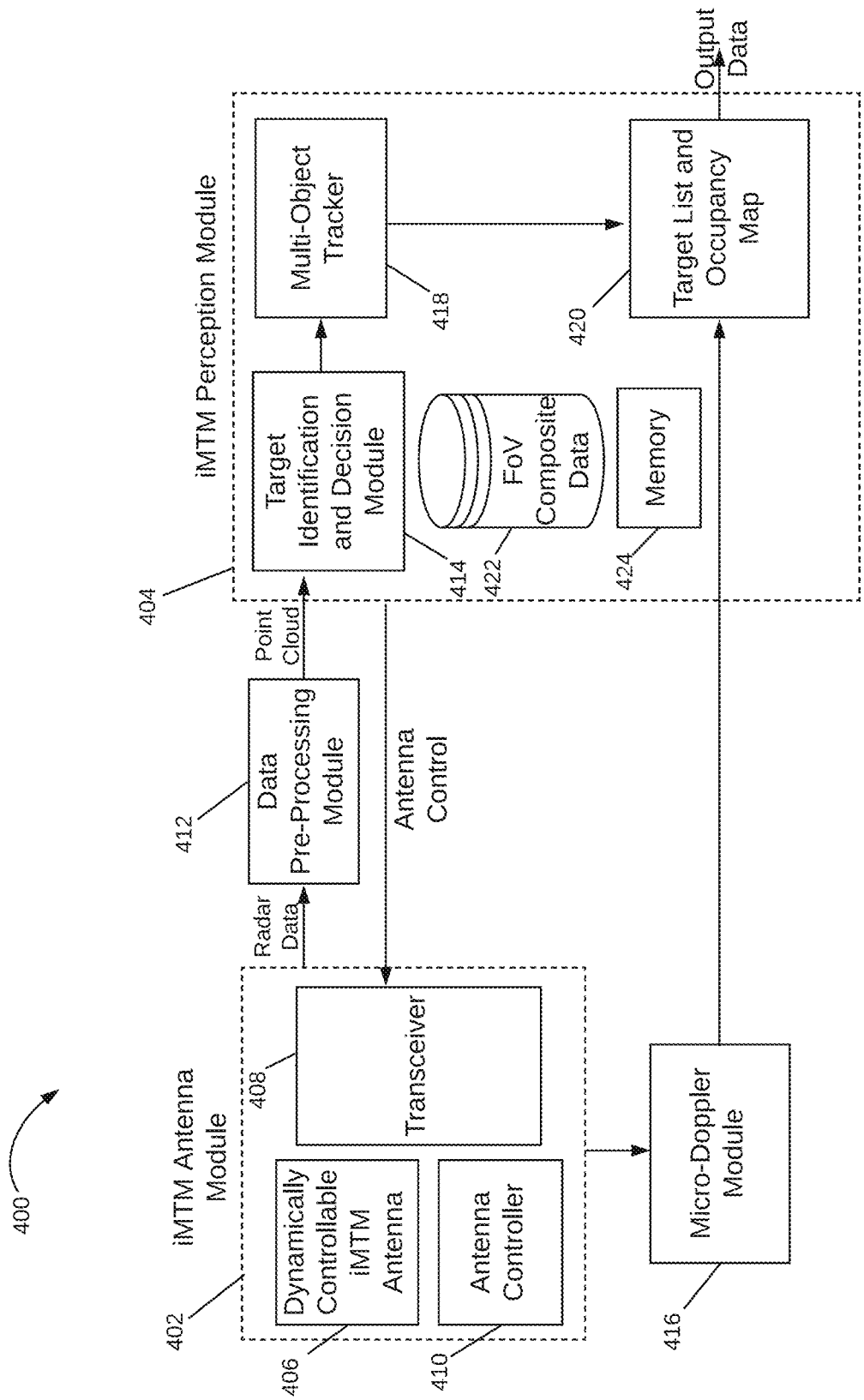
FIG. 4 illustrates a schematic diagram of an iMTM radar system for use in an autonomous driving system in accordance with various examples.

Ego iMTM radar 202 includes an iMTM antenna module (described in more detail below with reference to FIGS. 4 and 5) for providing dynamically controllable and steerable beams that can focus on one or multiple portions of a 360° FoV of the vehicle. The beams radiated from the iMTM antenna module are reflected from targets in the vehicle's path and surrounding environment and received and processed by the ego iMTM radar 202 to detect and identify the targets. The ego iMTM radar 202 also has an iMTM perception module as shown in FIG. 4 that is trained to detect and identify targets and control the iMTM antenna module as desired. Camera sensor 204 and ego lidar 206 are also used to detect targets in the path and surrounding environment of the ego vehicle, albeit in a much lower range.

Infrastructure sensors 208 may provide information from infrastructure while driving, such as from a smart road configuration, billboard information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, and so forth. Operational sensors 212 provide information about the functional operation of the vehicle. This may be battery charge level, tire pressure, fuel levels, brake wear, and so forth. The user preference sensors 214 may be configured to detect conditions that are part of a user preference. This may be temperature adjustments, smart window shading, and so forth. Other sensors 216 may include additional sensors for monitoring conditions in and around the vehicle.

In various examples, the sensor fusion module 220 optimizes these various functions to provide an approximately comprehensive view of the vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by an iMTM perception module in autonomous driving system 200 to adjust the beam size of the iMTM antenna module to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new weather conditions. The configuration may include turning off one or more sensors, such as camera 204 and/or lidar 206 or reducing the sampling rate of these visibility-based sensors. This effectively places reliance on the sensor(s) adapted for the current situation. In response, the iMTM perception module configures the iMTM radar 202 for these conditions as well. For example, the iMTM radar 202 may reduce the beam width to provide a more focused beam, and thus a finer sensing capability.

In various examples, the sensor fusion module 220 may send a direct control signal to the iMTM antenna module based on historical conditions and controls. The sensor fusion module 220 may also use some of the sensors within autonomous driving system 200 to act as feedback or calibration for the other sensors. In this way, an operational sensor 212 may provide feedback to the iMTM perception module and/or the sensor fusion module 220 to create templates, patterns and control scenarios. These are based on successful actions or may be based on poor results, where the sensor fusion module 220 learns from past actions.

Data from sensors 202-216 may be combined in sensor fusion module 220 to form fused sensor data that improves the target detection and identification performance of autonomous driving system 200. Sensor fusion module 220 may itself be controlled by system controller 222, which may also interact with and control other modules and systems in the vehicle. For example, system controller 222 may turn on and off the different sensors 202-216 as desired, or provide instructions to the vehicle to reduce velocity or stop upon identifying a driving hazard (e.g., deer, pedestrian, cyclist, or another vehicle suddenly appearing in the vehicle's path, flying debris, etc.)

All modules and systems in autonomous driving system 200 communicate with each other through communication module 218. Autonomous driving system 200 also includes system memory 224, which may store information and data (e.g., static and dynamic data) used for operation of autonomous driving system 200 and the ego vehicle using autonomous driving system 200. V2V communication module 226 is used for communication with other vehicles, including a lead vehicle (e.g., 110) and an AV vehicle (e.g., 114). The V2V communications between the ego vehicle and the lead and AV vehicles include data received from lead vehicle lidar 228 and AV lidar 230, respectively. The data received is processed by sensor fusion module 220 to assist in the training and perceptual inference performance of the iMTM perception module in the ego vehicle. The V2V communications may also include information from other vehicles that is invisible to the user, driver, or rider of the vehicle, and may help vehicles coordinate to avoid an accident.

Figure 3:
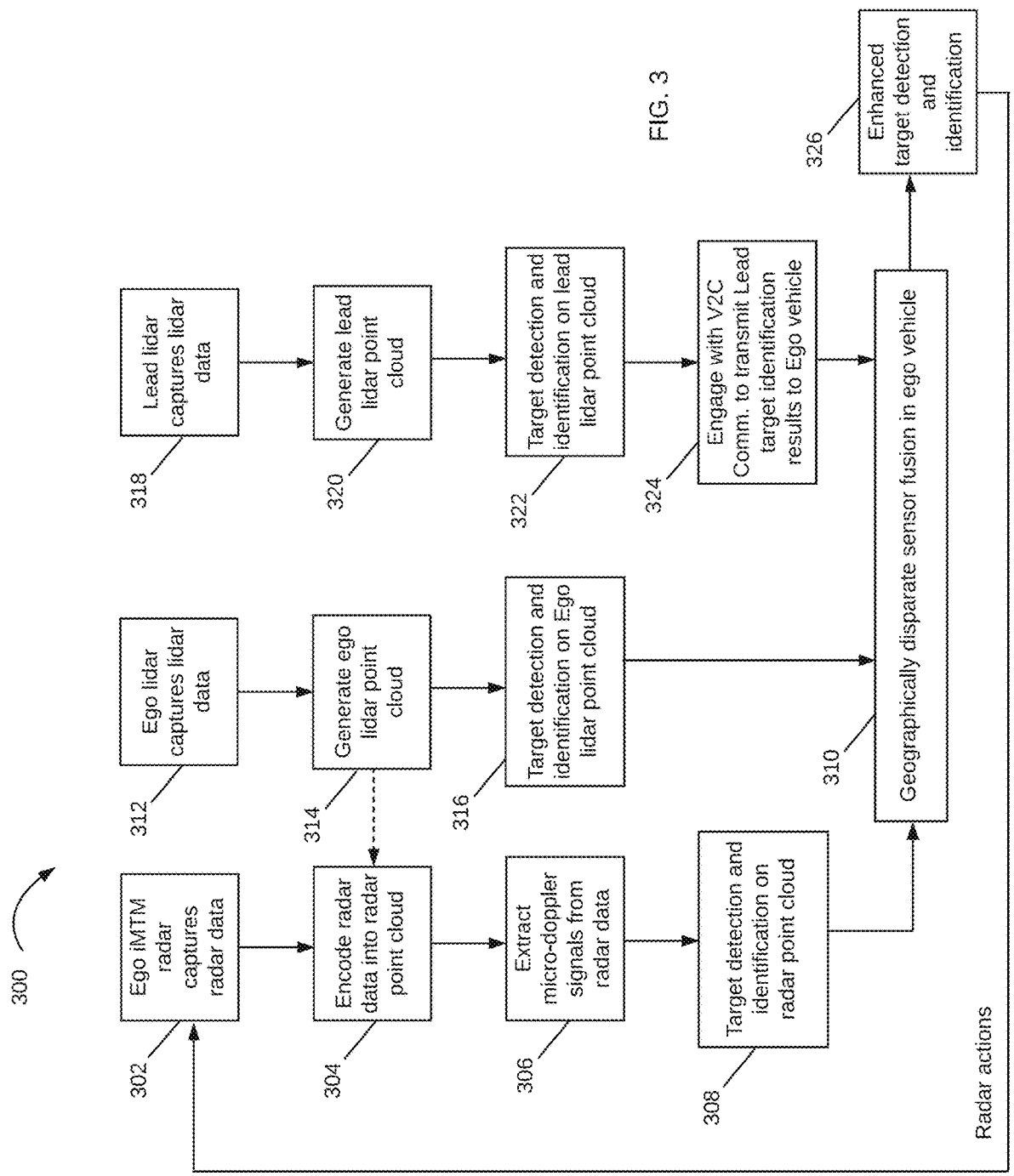
FIG. 3 is a flowchart of a process for enhancing target detection and identification in an ego vehicle with geographically disparate sensor fusion in accordance with various examples.

Attention is now directed to FIG. 3, which is a flowchart of a process 300 for enhancing target detection and identification in an ego vehicle with geographically disparate sensor fusion in accordance with various examples. First, the ego iMTM radar generates RF beams with determined parameters such as beam width, transmit angle, etc., at the direction of a controller as described in more detail below with reference to FIGS. 4 and 5. In some aspects, the RF beam includes a frequency-modulated continuous wave (FMCW) signal, in which the frequency of the waveform increases over time. The controller may, for example, determine the parameters at the direction of the iMTM perception module, which may at any given time want to focus on a specific area of a FoV upon detecting and identifying targets of interest in the ego vehicle's path. The controller determines the direction, power, and other parameters of the beams and controls the ego iMTM radar to achieve beam steering in various directions. The controller also determines a voltage matrix to apply to capacitance control mechanisms in the ego iMTM radar to achieve a given phase shift.

The ego iMTM radar radiates RF beams having the determined parameters and they are reflected from targets in and around the ego vehicle's path (e.g., in a 360° field of view). The radar data is captured by a transceiver module in the ego iMTM radar (302) and encoded into a radar point cloud (304). Micro-doppler signals are extracted from the radar data to aid in the identification of targets by the iMTM perception module (306). The micro-doppler signals enable a more accurate identification of targets as they provide information on the occupancy of a target in various directions.

Next, a target identification and decision module in the iMTM perception module receives the 4D radar data from the iMTM antenna module, processes the data to detect and identify targets, and determines the control actions to be performed by the ego iMTM radar based on the detection and identification of such targets (308). For example, the target identification and decision module may detect a cyclist on the path of the vehicle and direct the ego iMTM radar, at the instruction of its controller, to focus additional RF beams at given phase shift and direction within the portion of the field of view corresponding to the cyclist's location.

The iMTM perception module also includes a multi-object tracker to track the identified targets over time, such as, for example, with the use of a Kalman filter. Information on identified targets over time are stored at a target list and occupancy map, which keeps track of targets' locations and their movement over time as determined by the multi-object tracker. The tracking information provided by the multi-object tracker and the micro-doppler signal are combined to produce an output containing the type of target identified, their location, their velocity, and so on.

The output of the ego iMTM radar is provided to a sensor fusion module in the ego vehicle (310), which combines the output of the ego iMTM radar with outputs from the ego lidar as well as from a lead vehicle lidar to form fused sensor data. The output of the ego lidar is generated after the ego lidar captures lidar data from the ego vehicle (312), produces an ego lidar point cloud (314), and performs a preliminary target detection and identification on the ego lidar point cloud (316). Similarly, the output of the lead vehicle lidar is generated after the lead lidar captures lidar data from the lead vehicle (318), produces a lead lidar point cloud (320), and performs a preliminary target detection and identification on the lead lidar point cloud (322). The target detection and identification results of the lead lidar vehicle are shared with the sensor fusion module in the ego vehicle through the ego vehicle's V2V communications module (324). The sensor fusion module of the ego vehicle combines all outputs to produce target detection and identification results that are enhanced by the sensor data from the geographically disparate sensors (326). The enhanced target detection and identification results may then be used by the ego iMTM radar to determine next actions, such as what RF beams to send next and with which parameters (e.g., beam width, azimuth and elevation angles, etc.).

It is noted that the ego lidar point cloud may be shared with the ego iMTM radar when generating its radar point cloud (304), such as, for example, by using the ego lidar point cloud to assist in Non-Line-of-Sight ("NLOS") correction for the radar point cloud. Note also that the target detection and identification steps performed on the ego lidar point cloud (316) and on the lead lidar point cloud (322) may be omitted. In this case, the ego lidar point cloud and the lead lidar point cloud may be sent directly to the sensor fusion module in the ego vehicle (via the V2V communications module), which may then combine the information in the lidar point clouds with the target detection and identification information from the ego iMTM radar for a higher accuracy if needed. It is also appreciated that additional AVs may be used in geographically disparate locations to further enhance the target detection and identification results. The geographically disparate locations of the lead vehicle and any other AV may be pre-determined according to the range capabilities of the lidar in those vehicles relative to the range capabilities of the sensors in the ego vehicle. Further, the locations may be adjusted as needed, such as during real-world data collection for training purposes of the iMTM perception module in the iMTM radar.

FIG. 4 illustrates a schematic diagram of an iMTM radar system 400 for use in an ego vehicle in accordance with various examples. The iMTM radar system 400 is a "digital eye" with true 3D vision and capable of a human-like interpretation of the world. The "digital eye" and human-like interpretation capabilities are provided by two main modules: iMTM Antenna Module 402 and iMTM Perception Module 404.

The iMTM antenna module 402 includes a Dynamically Controllable iMTM ("DCiMTM") antenna 406, a transceiver module 408 and an antenna controller 410. The DCiMTM antenna 406 can radiate dynamically controllable and highly-directive RF beams using metastructures. A metastructure, as generally defined herein, is an engineered, non- or semi-periodic structure that is spatially distributed to meet a specific phase and frequency distribution. In some implementations, the metastructures include metamaterials. The transceiver module 408 is coupled to the DCiMTM antenna 406, and prepares a signal for transmission, such as a signal for a radar device. In some aspects, the signal is defined by modulation and frequency. The signal is provided to the DCiMTM antenna 406 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 410, such as at the direction of iMTM perception module 404.

The RF beams reflect from targets in the ego vehicle's path and surrounding environment, and the RF reflections are received by the transceiver module 408. Radar data from the received RF beams is provided to the iMTM perception module 404 for target detection and identification. A data pre-processing module 412 processes the radar data to encode it into a point cloud for use by the iMTM perception module 404. In various examples, the data pre-processing module 412 can be a part of the iMTM antenna module 402 or the iMTM perception module 404, such as on the same circuit board as the other modules within the iMTM antenna module 402 or iMTM perception module 404. Also, in various examples, the data encoding may use the lidar point cloud from the ego lidar to perform NLOS correction in the radar data.

The radar data may be organized in sets of Range-Doppler ("RD") map information, corresponding to 4D information that is determined by each RF beam reflected from targets, such as azimuthal angles, elevation angles, range, and velocity. The RD maps may be extracted from FMCW radar signals, and may contain both noise and systematic artifacts from Fourier analysis of the radar signals. The iMTM perception module 404 controls further operation of the iMTM antenna module 402 by, for example, providing an antenna control signal containing beam parameters for the next RF beams to be radiated from the iMTM cells in the DCiMTM antenna 406.

In operation, the antenna controller 410 is responsible for directing the DCiMTM antenna 406 to generate RF beams with determined parameters such as beam width, transmit angle, and so on. The antenna controller 410 may, for example, determine the parameters at the direction of iMTM perception module 404, which may at any given time determine to focus on a specific area of an FoV upon identifying targets of interest in the ego vehicle's path or surrounding environment. The antenna controller 410 determines the direction, power, and other parameters of the RF beams and controls the DCiMTM antenna 406 to achieve beam steering in various directions. The antenna controller 410 also determines a voltage matrix to apply to reactance control mechanisms coupled to the DCiMTM antenna 406 to achieve a given phase shift. In some examples, the DCiMTM antenna 406 is adapted to transmit a directional beam through active control of the reactance parameters of the individual iMTM cells that make up the DCiMTM antenna 406. The iMTM perception module 404 provides control actions to the antenna controller 410 at the direction of the Target Identification and Decision Module 414.

Next, the DCiMTM antenna 406 radiates RF beams having the determined parameters. The RF beams are reflected off of targets in and around the ego vehicle's path (e.g., in a 360° field of view) and are received by the transceiver module 408 in iMTM antenna module 402. The iMTM antenna module 402 transmits the received 4D radar data to the data pre-processing module 412 for generating a point cloud that is then sent to the target identification and decision module 414 of the iMTM perception module 404. A micro-doppler module 416 coupled to the iMTM antenna module 402 and the iMTM perception module 404 extracts micro-doppler signals from the 4D radar data to aid in the identification of targets by the iMTM perception module 404. The micro-doppler module 416 takes a series of RD maps from the iMTM antenna module 402 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the iMTM perception module 404 can determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 416 can be a part of the iMTM antenna module 402 or the iMTM perception module 404, such as on the same circuit board as the other modules within the iMTM antenna module 402 or iMTM perception module 404.

The target identification and decision module 414 receives the point cloud from the data pre-processing module 412, processes the point cloud to detect and identify targets, and determines the control actions to be performed by the iMTM antenna module 402 based on the detection and identification of such targets. For example, the target identification and decision module 414 may detect a cyclist on the path of the ego vehicle and direct the iMTM antenna module 402, at the instruction of its antenna controller 410, to focus additional RF beams at a given phase shift and direction within the portion of the FoV corresponding to the cyclist's location.

The iMTM perception module 404 may also include a multi-object tracker 418 to track the identified targets over time, such as, for example, with the use of a Kalman filter. The multi-object tracker 418 matches candidate targets identified by the target identification and decision module 414 with targets it has detected in previous time windows. By combining information from previous measurements, expected measurement uncertainties, and some physical knowledge, the multi-object tracker 418 generates robust, accurate estimates of target locations.

Information on identified targets over time are then stored at a target list and occupancy map 420, which keeps track of targets' locations and their movement over time as determined by the multi-object tracker 418. The tracking information provided by the multi-object tracker 418 and the micro-doppler signal provided by the micro-doppler module 416 are combined at the target list and occupancy map 420 to produce an output containing the type/class of target identified, their location, their velocity, and so on. This information from iMTM radar system 400 is then sent to a sensor fusion module (e.g., sensor fusion module 220 in the ego vehicle), where it is processed together with information from other sensors in the ego vehicle.

In various examples, the iMTM perception module 404 includes an FoV composite data unit 422, which stores information that describes an FoV. This information may be historical data used to track trends and anticipate behaviors and traffic conditions or may be instantaneous or real-time data that describes the FoV at a moment in time or over a window in time. The ability to store this data enables the iMTM perception module 404 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the iMTM perception module 404 may determine to narrow the beam width for a more focused view of that sector or area in the FoV. The next scan may indicate the targets' length or other dimension, and if the target is a vehicle, the iMTM perception module 404 may consider what direction the target is moving and focus the beams on that area. Similarly, the echo may be from a spurious target, such as a bird, which is small and moving quickly out of the path of the vehicle. There are a variety of other uses for the FoV composite data 422, including the ability to identify a specific type of target based on previous detection. The iMTM perception module 404 also includes a memory 424 that stores useful data for iMTM radar system 400, such as, for example, information on which subarrays of the DCiMTM antenna 406 perform better under different conditions.

In various examples described herein, the use of iMTM radar system 400 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 115 km/h, a driver may need to slow down to 40 km/h when visibility is poor. Using the iMTM radar system 400, the driver (or driverless vehicle) may maintain the maximum safe speed without regard to the weather conditions. Even if other drivers slow down, a vehicle enabled with the iMTM radar system 400 is able to detect those slow-moving vehicles and obstacles in its path and avoid/navigate around them.

Figure 5:
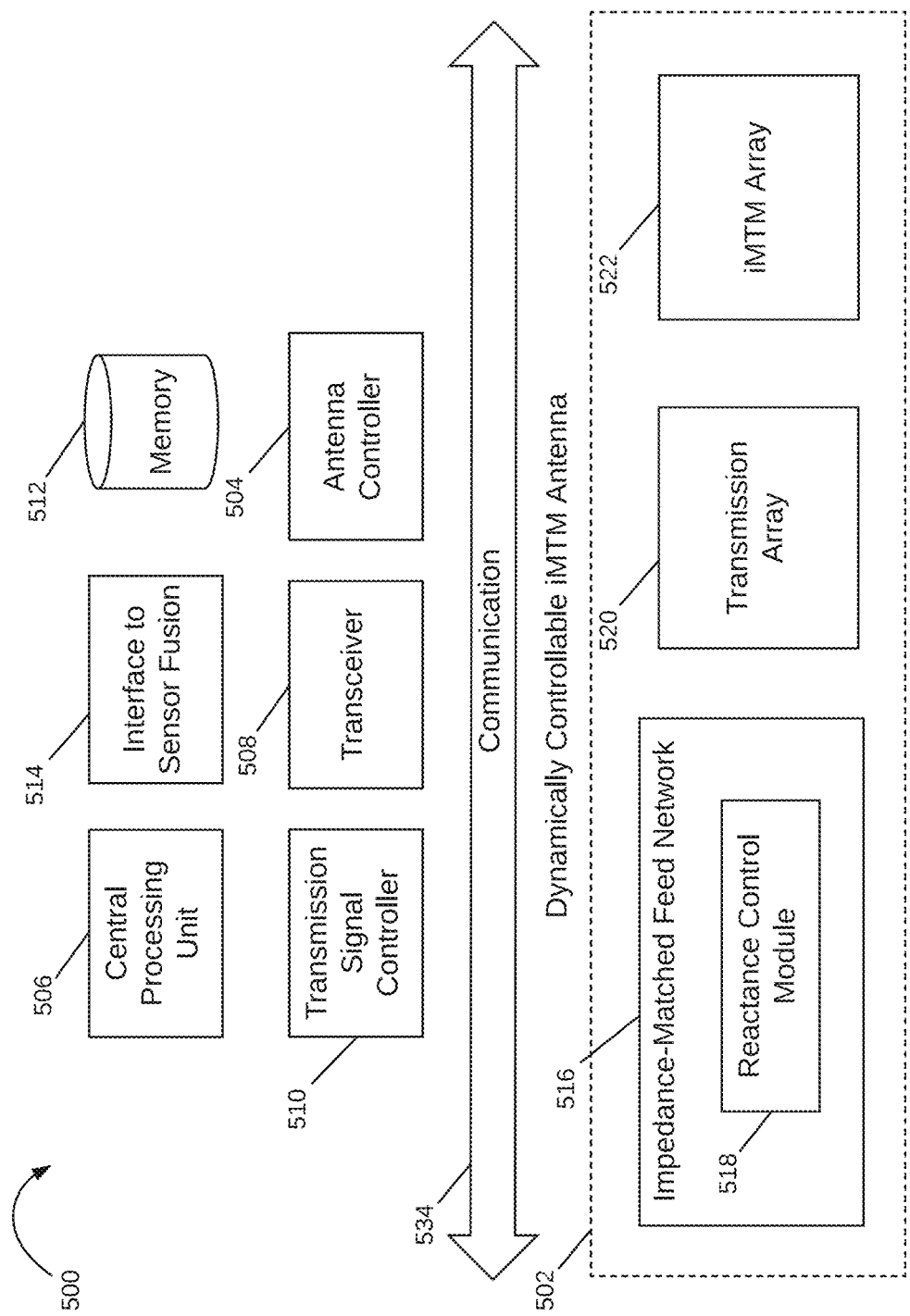
FIG. 5 is a schematic diagram of an iMTM antenna module for use with the iMTM radar system of FIG. 4 in accordance with various examples.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the iMTM perception module 404 adjusts the focus of the RF beam to a larger beam width, thereby enabling a faster scan of areas where there are few echoes. The iMTM perception module 404 may detect this situation by evaluating the number of echoes received within a given time period and making beam size adjustments accordingly. Once a target is detected, the iMTM perception module 404 determines how to adjust the beam focus. This is achieved by changing the specific configurations and conditions of the DCiMTM antenna 406. In one example scenario, the voltages on the reactance control mechanisms of the reactance control module (e.g., as shown in FIG. 5) of DCiMTM antenna 406 are adjusted. In another example scenario, a subset of iMTM unit cells is configured as a subarray. This configuration means that this set may be treated as a single unit, and all the cells within the subarray are adjusted similarly. In another scenario, the subarray is changed to include a different number of unit cells, where the combination of iMTM unit cells in a subarray may be changed dynamically to adjust to conditions and operation of the iMTM radar system 400.

All of these detection scenarios, analysis and reactions may be stored in the iMTM perception module 404, such as in the memory 424, and used for later analysis or simplified reactions. For example, if there is an increase in the echoes received at a given time of day or on a specific highway, that information is fed into the antenna controller 410 to assist in proactive preparation and configuration of the DCiMTM antenna 406. Additionally, there may be some subarray combinations that perform better, such as to achieve a desired result, and this is stored in the memory 424.

Attention is now directed to FIG. 5, which shows a schematic diagram of an iMTM antenna module 500 for use with the iMTM radar system 400 of FIG. 4 in accordance with various examples. The iMTM antenna module 500 has an DCiMTM antenna 502 coupled to an antenna controller 504, a central processor 506, and a transceiver 508. A transmission signal controller 510 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 510 may also generate a cellular modulated signal, such as an Orthogonal Frequency Division Multiplexed ("OFDM") signal. In some examples, the signal is provided to the iMTM antenna module 500 and the transmission signal controller 510 may act as an interface, translator or modulation controller, or otherwise as required for the signal to propagate through a transmission line system. The received information is stored in a memory storage unit 512, wherein the information structure may be determined by the type or transmission and modulation pattern.

The DCiMTM antenna 502 includes a transmission array 520 and an iMTM array 522. In operation, the DCiMTM antenna 502 radiates the signal to a radiating array of iMTM cells in the iMTM array 522. In various examples, the DCiMTM antenna 502 includes an impedance-matched feed network 516, having a reactance control module 518. The reactance control module 518 includes a reactance control mechanism controlled by antenna controller 504, which may be used to control the phase of a radiating signal from radiating array structures, such as iMTM array 522.

Note that as illustrated in FIG. 5, there is one DCiMTM antenna 502 in iMTM antenna module 500. However, an iMTM antenna module 500 may have multiple DCiMTM antennas in any given configuration. A set of DCiMTM antennas may be designated as transmit antennas, and another set may be designated as receive antennas. Further, a DCiMTM antenna may be orthogonal from another. Different DCiMTM antennas may also have different polarizations. In various examples, different DCiMTM antennas may be configured to detect different targets, e.g., a set of antennas may be configured to enhance the detection and identification of pedestrians, another set of antennas may be configured to enhance the detection and identification of vehicles, and so forth. In the case of pedestrians, the configuration of the antennas may include power amplifiers to adjust the power of a transmitted signal and/or different polarization modes for different arrays to enhance pedestrian detection. It is appreciated that numerous configurations of DCiMTM antennas may be implemented in a given iMTM antenna module.

In operation, the antenna controller 504 receives information from other modules in iMTM antenna module 500 and/or from iMTM perception module 404 in FIG. 4 indicating a next radiation beam. A radiation beam may be specified by parameters such as beam width, transmit angle, transmit direction and so forth. The antenna controller 504 determines a voltage matrix to apply to the reactance control module 518 in DCiMTM antenna 502 to achieve a given phase shift or other parameters. In these examples, the DCiMTM antenna 502 is adapted to transmit a directional beam without using digital beam forming methods, but rather through active control of the reactance parameters of the individual iMTM cells that make up the iMTM array 522.

Transceiver 508 prepares a signal for transmission, such as a signal for a radar device, in which the signal is defined by modulation and frequency. The signal is received by the DCiMTM antenna 502 and the phase of the iMTM cells in the iMTM array 522 is adjusted at the direction of the antenna controller 504. In some examples, transmission signals are received by a portion, or subarray(s), of the iMTM array 522. The iMTM array 522 can be implemented in many applications, including radar, cellular antennas, and autonomous vehicles to detect and identify targets in the path of or surrounding the vehicle. Alternate examples may use the iMTM array 522 for wireless communications, medical equipment, sensing, monitoring, and so forth. Each application type incorporates designs and configurations of the elements, structures and modules described herein to accommodate their needs and goals.

In iMTM antenna module 500, a signal is specified by antenna controller 504, which may be at the direction of an iMTM perception module (e.g., iMTM perception module 404 in FIG. 4), a sensor fusion module (e.g., sensor fusion module 220 in FIG. 2) via interface to sensor fusion 514, or it may be based on program information from memory storage unit 512. There are a variety of considerations to determine the beam formation, in which this information is provided to antenna controller 504 to configure the various elements of the iMTM array 522, which are described herein. The transmission signal controller 510 generates the transmission signal and provides it to the DCiMTM antenna 502, such as through a coaxial cable or other connector. The signal propagates through the impedance-matched feed network 516 to the transmission array 520 and iMTM array 522 for transmission through the air.

The impedance-matched feed network 516 includes impedance matching mechanisms and a reactance control module 518 for respectively matching input signal parameters with the iMTM cells in iMTM array 522 and providing phase shift control to each cell. The impedance matching mechanisms may include a directional coupler having an input port to each of adjacent transmission lines in the impedance-matched feed network 516. The adjacent transmission lines in impedance-matched feed network 516 may form a super element, in which an adjacent transmission line pair has a specific phase difference, such as a 90° phase difference with respect to each other.

The impedance matching mechanisms work in coordination with the reactance control module 518 to provide phase shifting of the radiating signal(s) from the iMTM array 522. In various examples, the reactance control module 518 includes a reactance control mechanism controlled by antenna controller 504, which may be used to control the phase of a radiating signal from the iMTM cells in the iMTM array 522 and to adjust the effective reactance of a transmission line and/or a cell fed by a transmission line in the impedance-matched feed network 516. The reactance control module 518 may, for example, include a varactor, a varactor network, a phase shift network, or any other mechanism capable of providing a desired phase shift up to 360° in each iMTM cell. The phase shift network system may include multiple varactors to achieve the desired phase shift.

One or more reactance control mechanisms may be placed within a transmission line in the impedance-matched feed network 516. Similarly, reactance control mechanisms may be placed within multiple transmission lines or within each iMTM radiating cell to achieve a desired result. The reactance control mechanisms may have individual controls or may have a common control. In some examples, a modification to a first reactance control mechanism is a function of a modification to a second reactance control mechanism. Further, the reactance control module 518 may be positioned within the architecture of impedance-matched feed network 516; one or both may be external to the impedance-matched feed network 516 for manufacture or composition as an antenna or radar module.

Figure 6:
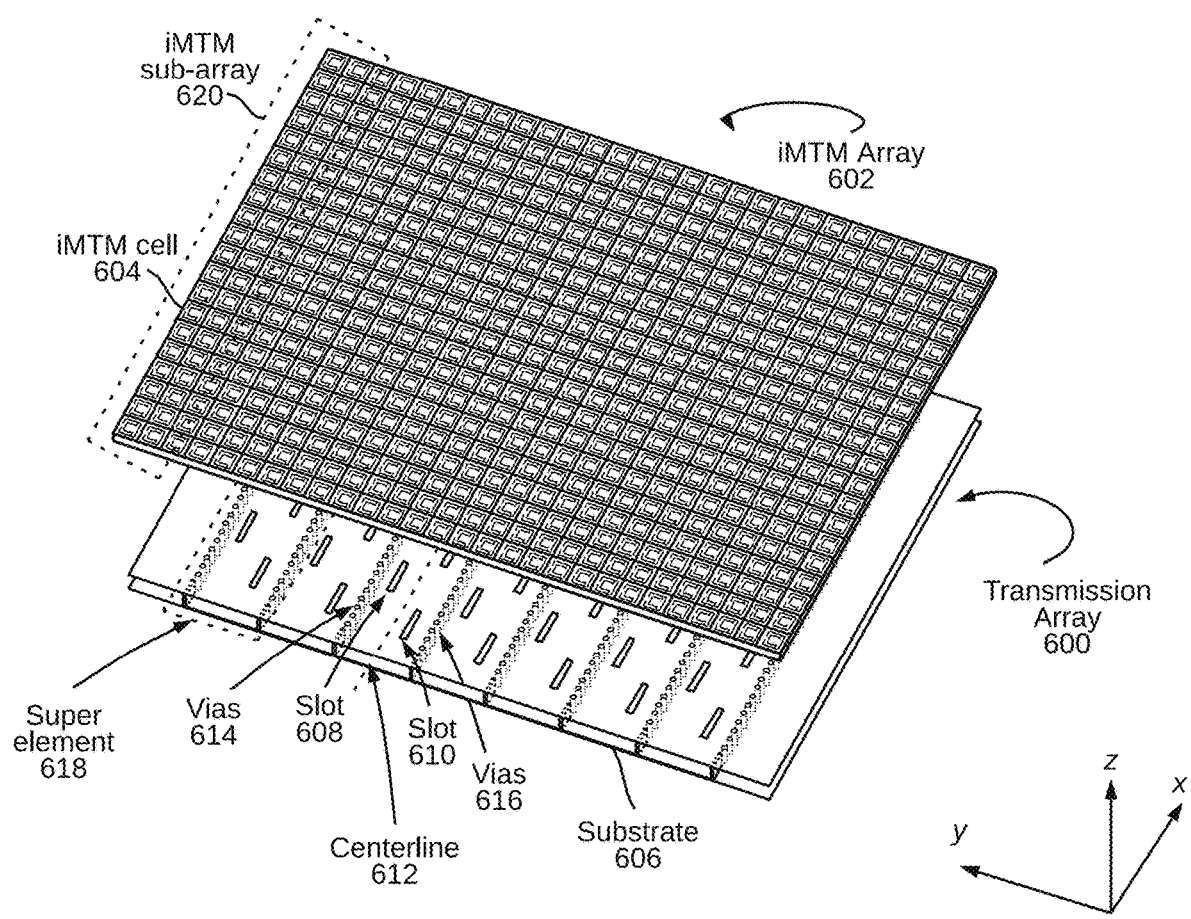
FIG. 6 is a schematic diagram of a transmission array and an iMTM array for use in the DCiMTM antenna of FIG. 5 in accordance with various examples.

Attention is now directed to FIG. 6, which illustrates a schematic diagram of a transmission array 600 and an iMTM array 602 for use in the DCiMTM antenna 502 of FIG. 5 in accordance with various examples. The iMTM array 602 is composed of individual iMTM cells, such as iMTM cell 604. The iMTM array 602 may take a variety of forms and is designed to operate in coordination with the transmission array 600. The iMTM array 602 may also operate as a single array or may be controlled to operate as multiple subarrays, in which each of the array or subarrays acts to generate a radiation beamform that is steerable through control of the reactance of individual iMTM unit cells. In various examples, the transmission signals sent by the transceiver 508 of FIG. 5 are received by a portion, or subarray, of iMTM array 602, such as iMTM subarray 620. The iMTM array 602 is an array of individual iMTM radiating cells (e.g., an 8×16 array), in which each of the iMTM cells has a uniform size and shape; however, some examples may incorporate different sizes, shapes, configurations and array sizes.

The transmission array 600 includes a substrate 606 having multiple conductive layers and a dielectric layer sandwiched therebetween. In various examples, the transmission array 600 is configured as super elements that are along the x-direction of the iMTM array 602, in which each super element includes a plurality of slots or discontinuities (e.g., slots 608, 610) in the conductive layer proximate the iMTM cells in iMTM array 602. A signal is provided to each of the super elements that radiates through the slots in the super elements and feeds the iMTM cells in iMTM array 602. The various super elements may be fed with signals of different phase, thus providing phase shifting in the y-direction, while the iMTM array 602 may be controlled so as to shift the phase of the transmission signal in the y-direction and/or the x-direction, while the signal transmits in the z-direction. The ability to control the directivity and phase of the transmission signal provides flexibility and responsive behavior for wireless communications and radar applications.

The transmission array 600 may be referred to as a type of a Slotted Waveguide Antenna ("SWA") and may include passive or active components (not shown) for matching phase control, amplitude tampering, and other RF enhancement functionalities. The distances between the iMTM unit cells in iMTM array 602 can be much lower than half the wavelength of the radiating frequency of the transmission signal. Active and passive components may be placed on the iMTM cells with control signals either routed internally through the super elements or externally through or on upper portions of the transmission array 600. Alternate configurations may reconfigure and/or modify the transmission array 600 and iMTM array 602 to improve radiation patterns, bandwidth, side lobe levels, and so forth.

The antenna performance may be adjusted by design of the transmission array 600 features and materials, such as the shape of the slots, slot patterns, slot dimensions, conductive trace materials and patterns, as well as other modifications to achieve impedance matching and so forth. The substrate 606 may have two portions of dielectric separated by a slotted transmission line positioned therebetween. The slotted transmission line may be disposed on substrate 606, in which each transmission line is within a bounded area; the boundary is a line of vias (e.g., vias 614, 616) etched through the conductive layer. The slots are configured within the conductive layer, where in the illustrated example the slots 608 and 610 are positioned symmetrically with respect to the center line 612. For clarity of understanding, FIG. 6 illustrates the slots as equidistant from center line 612, where the slots 608 and 610 are on opposite sides of the center line 612 and staggered along the direction thereof. A small portion super element 618 is illustrated in the transmission array 600.

Figure 7:
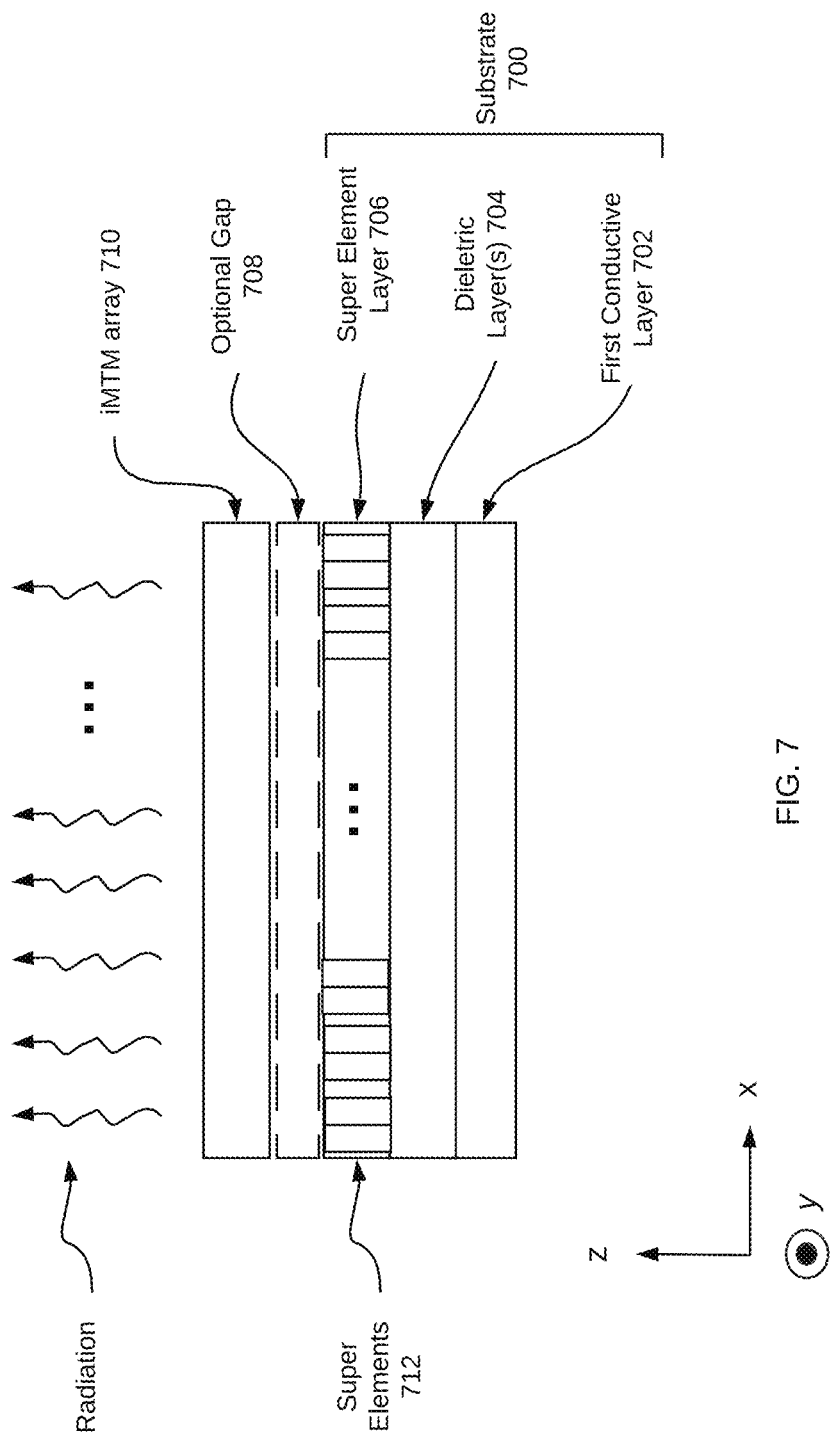
FIG. 7 is another perspective of the transmission array and iMTM array of FIG. 6 illustrating their various layers in accordance with various examples.

FIG. 7 is another perspective of the transmission array 600 and iMTM array 602 of FIG. 6 illustrating their layers in accordance with various examples. Substrate 700 includes a first conductive layer 702, a dielectric layer(s) 704, and a super element layer 706. The super elements are formed by conductive and non-conductive traces on a top portion of the super element layer 706 and by vias formed through the super element layer 706 and through the dielectric layer(s) 704. The vias (not shown) are lined with conductive material, or may be filled with conductive material, so as to form channels defining the super elements 712 and providing a wave guide function to maintain propagation of the signals fed into the super elements 712. An optional gap 708 may be placed between the super element layer 706 and the iMTM array 710, which contains the iMTM cells. The longitudinal direction of the super elements 712 in the perspective of FIG. 7 is into the page, in the y-direction, with the signal radiating in the z-direction. Again, note that these directions are for illustration and description purposes only and do not necessarily correlate to absolute references. Note also that the substrate 700 may be part of a DCiMTM antenna in a sensor fusion module (e.g., sensor fusion module 220 of FIG. 2) within an ego vehicle or infrastructure, whereby different locations share information and communicate with each other to provide information ahead of action, such as to identify a speeding car several blocks before it actually is in range of a given sensor. One or multiple sensors may provide alerts to other sensors in the environment to help detect other vehicles moving at a relatively high velocity. Further, information from geographically disparate lead and AV lidar sensors on other vehicles can be used to enhance the target detection and identification of the iMTM module in the ego vehicle.

Figure 8:
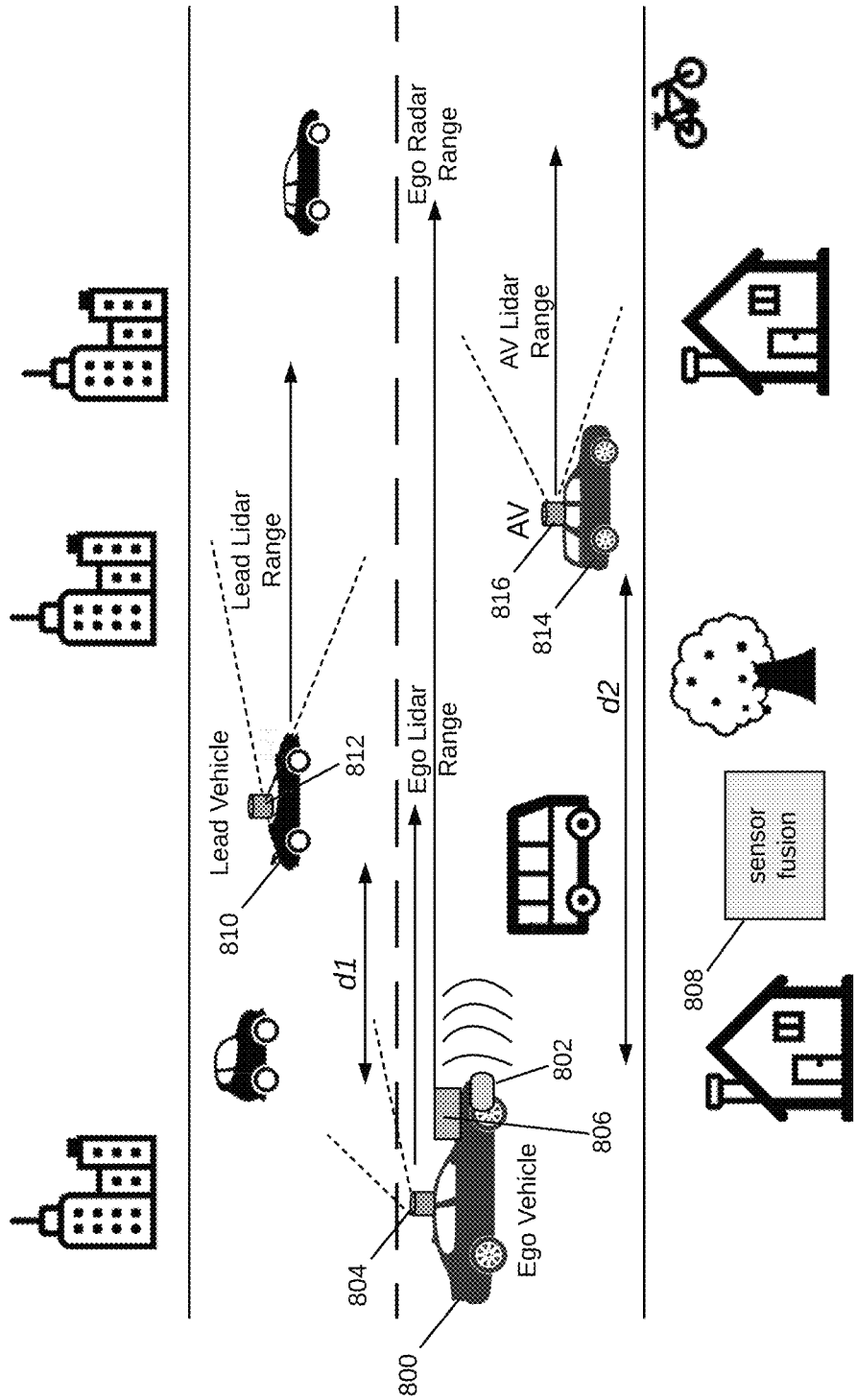
FIG. 8 is a schematic diagram of another example environment in which geographically disparate sensor fusion enhances target detection and identification in the environment for an ego vehicle.

In the above examples, the sensor fusion module is located in the ego vehicle. In other examples, such as illustrated in FIG. 8, the sensor fusion module may be a module outside of (or remote from) the ego vehicle, lead and AV vehicles. In this case, sensor fusion module 808 receives data from ego radar 806, ego lidar 804, lead lidar 812 and AV lidar 816 to enhance target detection and identification in the surrounding environment of the ego vehicle 800. The data may be sent to the sensor fusion module 808 with timestamps indicating the time of the data collection. In one example, this scenario may be implemented for off line training of the perception module in the ego vehicle 800. In another example, this scenario may be implemented for labeling of targets in the surrounding environment. Additional mapping information may be used in the labeling, such as to identify static targets like buildings, houses, trees, street signs, and so forth, and to focus the data collection and sensor fusion processing of the radar and lidar data on moving targets.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An autonomous control system, comprising:
    a radar module;
    a computer processing unit;
    a memory storage device;
    wherein the computer processing unit is configured to:
        receive sensor information from a plurality of sensors, the plurality of sensors including the radar module,
        detect and identify targets and determine control actions for the autonomous control system based on the sensor information, wherein the computer processing unit utilizes one or more deep learning networks that are trained with the radar data and the sensor data for target identification;
        track targets from sensor information based on a target list and occupancy map, wherein to track targets over time the computer processing unit utilizes a Kalman filter and combining sensor information from at least one previous timeframe with the sensor information from the plurality of sensors; and
        store information describing a field of view of the plurality of sensors in a composite data repository; and
    a communication bus coupled to the computer processing unit the radar module and the plurality of sensors.

2. The autonomous control system of claim 1, wherein the radar module comprises an antenna structure configured to generate and steer one or more transmission RF beams and receive one or more return RF beams reflected from the surrounding environment.

3. The autonomous control system of claim 1, wherein the autonomous control system is adapted to control a vehicle.

4. The autonomous control system as in claim 3, wherein the computer processing unit is configured to combine data from different perception sensors in the vehicle and data received from sensors in other geographically disparate vehicles to perceive an environment.

5. The autonomous control system as in claim 4, wherein the computer processing unit is configured to send a control signal to at least one of the plurality of sensors based on historical sensor data from the radar module.

6. The autonomous control system as in claim 5, wherein the radar module comprises an antenna array and the control signal controls directionality of one or more antenna cells in the antenna array.

7. The autonomous control system of claim 6, wherein the control signal comprises an instruction to the antenna array to radiate transmission RF beams at a first phase shift and direction within at least a portion of the field of view corresponding to a location of a target identified by the radar system.

8. The autonomous control system of claim 1, wherein the computer processing unit is adapted to receive information from sensor fusion modules in other autonomous control systems.

9. The autonomous control system of claim 8, wherein the received information from other autonomous control systems includes time stamps indicating a time of data collection and a location information.

10. The autonomous control system of claim 9, wherein the computer processing unit is adapted to receive mapping information for application to sensor information.

11. The autonomous control system of claim 10, wherein the mapping information is used to track targets.

12. The autonomous control system of claim 11, wherein the computer processing unit is configured to generate target identification information based on tracking information.

13. The autonomous control system as in claim 1, further comprising:
    a transceiver adapted to receive communications from other vehicles and infrastructure components.

14. A vehicle to vehicle (V2V) communication system in a vehicle, comprising:
    a computer processing unit, wherein the computer processing unit is configured to:
        receive information from vehicles, the information comprises sensor information from one or more sensors of the vehicles,
        detect and identify targets and determine control actions for the autonomous control system based on the sensor information, wherein the computer processing unit utilizes one or more deep learning networks that are trained with radar data and sensor data for target identification, and
        track targets from sensor information based on a target list and occupancy map, wherein to track targets over time the computer processing unit utilizes a Kalman filter and combining sensor information from at least one previous timeframe with the sensor information from the plurality of sensors; and
    a communication bus for communication with modules within the vehicle.

15. The V2V communication system as in claim 14, wherein the information is from a lead vehicle in a path of the vehicle.

16. The V2V communication system as in claim 15, further comprising a radar module adapted to provide range Doppler maps (RDM) to the computer processing unit.

17. The V2V communication system as in claim 16, wherein the computer processing unit receives point cloud data corresponding to the information and combining with RDM data from the radar module.

18. The V2V communication system as in claim 17, wherein the information provided to the computer processing unit is adapted to provide control decisions to avoid an accident.

19. The V2V communication system as in claim 14, wherein the information includes communications related to weather conditions in the environment.

* * * * *